(12) United States Patent
Kephart

(10) Patent No.: US 6,732,149 B1
(45) Date of Patent: May 4, 2004

(54) SYSTEM AND METHOD FOR HINDERING UNDESIRED TRANSMISSION OR RECEIPT OF ELECTRONIC MESSAGES

(75) Inventor: Jeffrey Owen Kephart, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,023

(22) Filed: Apr. 9, 1999

(51) Int. Cl.[7] .............................................. G06F 15/16
(52) U.S. Cl. ........................ 709/206; 709/232; 709/233
(58) Field of Search ................................ 709/206, 225, 709/232, 315, 318; 370/93.24, 312, 349; 707/1, 7, 10, 100, 102, 200, 206

(56) References Cited

U.S. PATENT DOCUMENTS

| | | | | |
|---|---|---|---|---|
| 5,619,648 A | * | 4/1997 | Canale et al. | 709/206 |
| 5,826,022 A | * | 10/1998 | Nielsen | 709/206 |
| 5,877,759 A | * | 3/1999 | Bauer | 345/339 |
| 5,883,640 A | * | 3/1999 | Hsieh et al. | 345/503 |
| 5,999,932 A | * | 12/1999 | Paul | 707/10 |
| 5,999,967 A | * | 12/1999 | Sundsted | 709/206 |
| 6,023,723 A | * | 2/2000 | McCormick et al. | 709/206 |
| 6,052,709 A | * | 4/2000 | Paul | 709/202 |
| 6,073,167 A | * | 6/2000 | Poulton et al. | 709/206 |
| 6,085,321 A | * | 7/2000 | Gibbs et al. | 713/170 |
| 6,144,934 A | * | 11/2000 | Stockwell et al. | 704/1 |
| 6,161,130 A | * | 12/2000 | Horvitz et al. | 709/206 |
| 6,167,434 A | * | 12/2000 | Pang | 709/206 |
| 6,173,364 B1 | * | 1/2001 | Zenchelsky et al. | 711/118 |
| 6,199,102 B1 | * | 3/2001 | Cobb | 709/206 |
| 6,212,525 B1 | * | 4/2001 | Guha | 707/101 |
| 6,240,409 B1 | * | 5/2001 | Aiken | 707/4 |
| 6,249,805 B1 | * | 6/2001 | Fleming, III | 709/206 |
| 6,292,795 B1 | * | 9/2001 | Peters et al. | 707/3 |
| 6,330,590 B1 | * | 12/2001 | Cotten | 709/206 |

FOREIGN PATENT DOCUMENTS

| | | | |
|---|---|---|---|
| EP | 0720333 A2 | 7/1996 | ........... H04L/12/58 |
| EP | 0813162 A2 | 12/1997 | ........... G06F/17/60 |
| EP | 0 89 918 A2 | * 9/1999 | ........... H04L/12/58 |
| JP | 10-74172 | 3/1998 | |
| JP | 11-15756 | 1/1999 | |
| JP | 11-252158 | 9/1999 | |
| WO | WO99/33188 | 7/1999 | |

OTHER PUBLICATIONS

Fast Retreival of Electronic Messages that Contain Mistyped Words or Spelling Errors, Wang, J.T.; Chia–Yo C., Systems, Man and Cybernetics, Part B, IEEE Transactions on pp. 441–451, Jun. 1997, ISSN: 1083–4419.*

Getting Rid of Spam, Here's a way to filter unwanted mail using procmail, Browing, B., downloaded from http://deliver.acm.org on Nov. 14, 2001, pp. 1–4.*

Fast Algorith for Sorting and Searching Strings, Bentley, J.; Sedgewick, R., Bell Labs, Lucent Tech, Symposium on Discrete Algorithm, Publisher ACM–SIAM, 1997, pp. 360–369, ISBN:0–89871–390–0.*

* cited by examiner

Primary Examiner—Marc D. Thompson
Assistant Examiner—Beatriz Plieto
(74) Attorney, Agent, or Firm—McGinn & Gibb, PLLC; Gail H. Zarick, Esq.

(57) ABSTRACT

A system and method of hindering an undesirable transmission or receipt of electronic messages within a network of users includes the steps of determining that transmission or receipt of at least one specific electronic message is undesirable; automatically extracting detection data that permits detection of the at least one specific electronic message or variants thereof; scanning one or more inbound and/or outbound messages from at least one user for the presence of the at least one specific electronic message or variants thereof; and taking appropriate action, responsive to the scanning step.

42 Claims, 6 Drawing Sheets

SYSTEM AND METHOD FOR HINDERING UNDESIRED TRANSMISSION OR RECEIPT OF ELECTRONIC MESSAGES

FIELD OF THE INVENTION

The present invention relates generally to digital data processors and networks of intercommunicating digital data processors capable of sending and receiving electronic mail and other types of electronic messages. In particular, the present invention relates to a system and method for automatically detecting and handling unsolicited and undesired electronic mail such as Unsolicited Commercial E-mail (UCE), also referred to as "spam."

BACKGROUND OF THE INVENTION

Every day, millions of Internet users receive unwelcome electronic messages, typically in the form of electronic mail (e-mail). The most familiar example of these messages is Unsolicited Commercial E-mail (UCE), commonly referred to as "spam." UCE typically promotes a particular good, service or web site, and is sent indiscriminately to thousands, or even millions, of people, the vast majority of whom find the UCE annoying or even offensive. UCE is widely perceived as a significant problem. Articles concerning UCE appear on an almost daily basis on technology news services, such as CNET. Several commercial and shareware products have been written to reduce e-mail users' exposure to UCE. At least one start-up company, Bright Light Technologies, has been founded for the sole purpose of producing and selling technology to detect and filter out UCE. Legal restrictions are being contemplated by several states, and actually have recently been put in place in more than one state.

Other forms of undesired e-mail include rumors, hoaxes and chain letters. Each of these forms of e-mail can proliferate within a network of users very quickly. Rumors can spread with much vigor throughout a user population and can result in wasted time and needless concern. The most successful computer virus hoaxes have a longevity comparable to that of computer viruses themselves, and can cause a good deal of panic. Finally, circulation of chain letters is a phenomenon that is serious enough to be forbidden by company policies or even federal laws.

A somewhat different class of e-mail, the transmission or receipt of which is often undesirable, is confidential e-mail. Confidential e-mail is not supposed to be forwarded to anyone outside of some chosen group. Therefore, there is a concern for controlling the distribution of these messages.

A common characteristic of UCE and electronically-borne rumors, hoaxes, and chain letters is that there is likely to be wide-spread agreement that the content of the message in question (and, thus, transmission thereof) is undesirable (as opposed to merely uninteresting). This, along with the fact that such messages are in electronic form, makes it possible to contemplate various technologies that attempt to automatically detect and render harmless this e-mail.

To date, UCE has been the exclusive focus of such efforts. Existing UCE solutions take a number of different forms. Some are software packages designed to work with existing e-mail packages (e.g., MailJail, which is designed to work with the Eudora mail system) or e-mail protocols (e.g., Spam Exterminator, which works for any e-mail package that supports the POP3 protocol on the Windows 95, Windows 98 or Windows NT platforms). Other solutions are integrated into widely used mail protocols (e.g., SendMail v. 8.8, a recent upgrade of the SendMail mail transfer protocol, which provides a facility for blocking mail relay from specified sites, or alternatively from any site other than those explicitly allowed). Another type of solution is an e-mail filtering service, e.g., the one offered by junkproof corn, which fines users who send UCE. Bright Light Technologies proposes to combine a software product with a service.

However they may be packaged, the vast majority of these solutions are composed of two main steps: recognition and response. In the recognition step, a given e-mail message is examined to determine whether it is likely to be spam. If the message is deemed likely to be spam during the recognition step, then some response is made. Typical responses include automatically deleting the message, labeling it or flagging it to draw the user's attention to the fact that it may be spam, placing it in a lower priority mail folder, etc., perhaps coupled with sending a customizable message back to the sender.

The main technical challenges lie in the recognition step. Two of the most important challenges include keeping the rates of false positives (falsely accusing legitimate mail as spam) and false negatives (failing to identify spam as such) as low as possible. A wide variety of commercial and freeware applications employ combinations and/or variations on the following basic spam detection strategies to address the general problem.

Domain-based Detection

Often, persons who send spam ("spammers") set up special Internet address domains from which they send spam. One common anti-spam solution is to maintain a blacklist of "spam" domains, and to reject, not deliver or return to the sender any mail originating from one of these domains. When spam begins to issue from a new "spam" domain, that domain can be added to the blacklist.

For example, xmission.com has modified sendmail.cf rules to cause mail from named sites to be returned to the sender. Their text file (http:H/spam.abuse.net/spam/tools/dropbad.txt) lists several domains that are known to be set up solely for use by spammers, including moneyworld.com, cyberpromo.com, bulk-e-mail.com, bigprofits.com, etc. At http://www.webeasy.com:8080/spam/spam_download_table, one can find just over 1000 such blacklisted sites. Recent versions of SendMail (versions 8.8 and above) have been modified to facilitate the use of such lists, and this has been regarded as an important development in the battle against spam.

However, if used indiscriminately, this approach can lead to high rates of false positives and false negatives. For instance, if a spammer were to send spam from the aol.com domain, aol.com could be added to the blacklist. As a result, millions of people who legitimately send mail from this domain would have their mail blocked. In other words, the false positive rate would be unacceptably high. On the other hand, spammers can switch nimbly from a banned domain to a non-banned, newly-created one, or one that is used by many legitimate users, thus leading to many false negatives.

Header-based Detection

A hallmark of spam is that it is sent to an extremely large number of recipients. There are often indications of this in the header of the mail message that can be taken as evidence that a message is likely to be spam. For example, the long list of recipients is typically dealt with by sending to a smaller set of collective names, so that the user's explicit e-mail address does not appear in the To: field.

Ross Rader of Internet Direct (Idirect) has published directions for setting up simple rules based on this characteristic of spam for a variety of popular e-mail programs, including Eudora Light, Microsoft Mail and Pegasus. When a mail message header matches the rule, that mail is automatically removed from the user's inbox and placed in a special folder where it can be examined later or easily deleted without inspection.

However, unless the user of this method puts a great deal of effort into personalizing these detection rules, the false positive rate has the potential to be quite high, so that a large proportion of legitimate e-mail will be classified as spam.

Text-based Keyword Detection

Spam is typically distinguished from ordinary e-mail in that it aggressively tries to sell a product, advocate visiting a pornographic web site, enlist the reader in a pyramid scheme or other monetary scam, etc. Thus, a piece of mail containing the text fragment "MAKE MONEY FAST" is more likely to be spam than one that begins "During my meeting with you last Tuesday."

Some anti-spam methods scan the body of each e-mail to detect keywords or keyphrases that tend to be found in spam, but not in other e-mail. The keyword and keyphrase lists are often customizable. This method is often combined with the domain- and header-based detection techniques described hereinabove. Examples of this technology include junkfilter (http://www.pobox.com/gsutter/junkmail), which works with procmail, Spam Exterminator and SPAM Attack Pro!.

Again, false positives may occur when ordinary e-mail messages contain banned keywords or keyphrases. This approach is prone to false negatives as well because the list of banned keyphrases would have to be updated several times per day to keep up with the influx of new instances of spam, and this is both technically difficult for the anti-spam vendor and unpalatable to the user.

Text-based Machine Classification

Spam Be Gone! is a freeware product that works with Eudora. It uses an instance-based classifier that records examples of spam and non-spam e-mail, and measures the similarity of each incoming e-mail to each of the instances, combining the similarity scores to arrive at a classification of the e-mail as spam or non-spam. The classifier is trained automatically for each individual user. It typically takes the user several weeks to a few months to develop a classifier.

After a sufficient amount of training, the false positive and false negative rates for this approach are claimed to be lower than for other techniques. In one cited case (http://www.internz.com/SpamBeGone/stats.html), which can be assumed to be an upper bound on the performance since an average over several users is not provided, the false negative rate was less than a few tenths of a percent after one or two months of training, while the false positive rate was 20% after one month and 5% after two months. Thus, even in the best case, 1 of every 20 messages labeled as spam will, in fact, be legitimate. This could be unacceptable, particularly if the anti-spam software responds in a strong manner, such as automatically deleting the mail or returning it to the sender.

All of the above UCE detection methods are "generic" in the sense that they use features that are generic to spam but much less common in ordinary non-spam e-mail. This is in contrast to "specific" detection techniques that are commonly employed by anti-virus programs to detect specific known computer viruses, typically by scanning host programs for special "signature" byte patterns that are indicative of specific viruses. Generic recognition techniques are attractive because they can catch new, previously unknown spam. However, as indicated hereinabove, their disadvantage is that they tend to yield unacceptably high false positive rates and, in some cases, unacceptably high false negative rates as well. Specific detection techniques typically have smaller false positive and false negative rates, but require more frequent updating than do generic techniques.

Generic detection techniques are even less likely to be helpful in recognizing other types of undesirable e-mail, such as rumors, hoaxes and chain letters or confidential e-mail. Recognition based on the sender's domain or other aspects of the mail header is unlikely to work at all. Generic recognition of hoaxes and chain letters on the basis of keywords or keyphrases present in the message body may be possible, but is likely to be more difficult than for spam because the range in content is likely to be broader. Generic recognition of confidential e-mail on the basis of text is almost certainly impossible because there is nothing that distinguishes confidential from non-confidential text in a way that is recognizable by any machine algorithm.

Bright Light Technologies promotes a different anti-spam product/service. Bright Light uses a number of e-mail addresses (or "probes") throughout the Internet which, in theory, receive only undesirable messages since they are not legitimate destinations. The messages received are read by operators located at a 24-hour a day operations center. These operators evaluate the messages and update rules which control a spam-blocking function in a mail server that serves a group of users.

While this method of UCE detection and response is inherently less vulnerable to false positives and false negatives because it uses specific rather than generic detection, it suffers from some drawbacks. Many of these stem from the considerable amount of manual effort required to maintain the service. The Bright Light operations center must employ experts who monitor streams of e-mail for spam, manually extract keywords and keyphrases that they believe to be good indicators of specific instances of spam, and store these keywords or keyphrases in a database. As it would most likely be prohibitive for any company to support such a set of experts on its own, any company wishing to protect itself in this way would be entirely dependent on continued, uninterrupted service by Bright Light's operations center. At least some companies might well prefer a solution that allows for greater freedom from an external organization, and greater customization than is likely to be achieved by a single organization. The crux of the problem is that Bright Light's method couples two tasks that ought to be independent of one another: labeling a message as undesirable, and extracting a signature from the undesirable message. If it were possible to reduce the requirement for manual input to that of labeling undesirable messages, this would enable localized collaborative determinations of undesirable messages. Furthermore, Bright Light does not describe a process by which experts extract auxiliary data that permit possible matches based on keywords or phrases to be tested more stringently by exact or approximate matching to entire specific messages (or large portions of them). Thus their specific solution is likely to be more vulnerable to false positives than one in which individual users would have the opportunity to specify more stringent conditions for message matching.

Another drawback is that the Bright Light solution is specifically targeted at UCE, as opposed to the broader class of undesirable messages that includes hoaxes, chain letters, and improperly forwarded confidential messages. Taken together, probe accounts may receive a reasonable fractional of all UCE, but it is unclear that they would attract chain letters and rumors.

It is, thus, an object of the present invention to provide an automatic, non-generic procedure for detecting and handling instances of all types of undesirable mail, with very low false positive and false negative rates.

A further object of the present invention is to provide an inexpensive solution which involves no staffing, but rather utilizes the users themselves to actively identify UCE.

A still further object of the present invention is to provide a system and method for preventing the undesired transmission and/or receipt of confidential e-mail messages.

SUMMARY OF THE INVENTION

The present invention provides an automated procedure for detecting and handling UCE and other forms of undesirable e-mail accurately, with low false negative rates and very low false positive rates. In contrast to existing generic detection methods, the present invention uses a specific detection technique to recognize undesirable messages. In other words, the system of the present invention efficiently detects undesirable messages on the basis of their exact or close matches to specific instances of undesirable messages. In contrast to the specific technique use by Bright Light, the character strings used to identify specific undesirable messages are derived completely automatically, and are supplemented with auxiliary data that permit the end user to tune the degree of match required to initiate various levels of response. A further point of contrast is that the automatic derivation of signature data permits greater flexibility because the only required manual input is the labeling of a particular message as undesirable. This permits ordinary users to work collaboratively to define undesirable messages, freeing them from dependence on an external, centralized operations center where experts must manually label and extract signatures from undesirable messages. It also permits authorities on hoaxes and chain letters to identify messages containing them, without further imposing the burden of extracting a signature, which would require a very different sort of expertise. Another point of contrast is that the extracted signature data can permit users to define independent, flexible definitions of what constitutes a given level of match, ranging from matching a signature to matching an entire message verbatim.

The method of the present invention includes, when a first ("alert") user receives a given instance of undesirable mail, labeling the message as undesirable, extracting a signature for the message, adding the signature to a signature database, periodically scanning a second (possibly including the same) users messages for the presence of any signatures in the database, identifying any of the second user's messages that contain a signature as undesirable and responding appropriately to any messages so labeled.

Specifically, the method of hindering an undesirable transmission or receipt of electronic messages within a network of users, includes the steps of: determining that transmission or receipt of at least one specific electronic message is undesirable; automatically extracting detection data that permits detection of the at least one specific electronic message or variants thereof, scanning one or more inbound and/or outbound messages from at least one user for the presence of the at least one specific electronic message or variants thereof, and taking appropriate action, responsive to the scanning step. Preferably, the method further includes the step of storing the extracted detection data.

Preferably, the determining step comprises the step of receiving notification that proliferation of the at least one specific electronic message is undesirable. The receiving step preferably includes the step of receiving a signal from an alert user identifying the at least one specific electronic message as undesirable or confidential. The at least one specific electronic message can be received in an inbox of the alert user. The receiving step preferably includes the step of providing an identifier for the alert user to indicate that the specific electronic message is to be flagged as undesirable. It is preferable that the providing step comprises the step of providing a generic detector to aid in identification of undesirability of electronic messages.

The extracting step of the present invention preferably includes the step of extracting, from the at least one specific electronic message, signature information. The storing step preferably comprises the step of adding, responsive to the scanning step, information pertaining to the at least one specific electronic message to the signature information. The signature information preferably includes a signature from the at least one specific electronic message. The storing step can include the step of storing the signature in at least one signature database. The signature database preferably comprises a plurality of signature clusters, each cluster including data corresponding to substantially similar electronic messages. Each of the signature clusters preferably comprises a character sequence component having scanning information and an archetype component having identification information about particular signature variants. The scanning information preferably includes a search character sequence for a particular electronic message and extended character sequence information for all the electronic messages represented in the cluster and wherein the identification information includes a pointer to a full text stored copy of an electronic message relating to a particular signature variant, a hashblock of the electronic message, and alert data corresponding to specific instances where a copy of the electronic message was received and the proliferation of which was reported as undesirable by an alert user.

The extracting step and the scanning step of the present invention can occur simultaneously and asynchronously across the network of users.

The method of present invention can further include the step of confirming, before the scanning step, the undesirability of the at least one specific electronic message. The confirming step preferably comprises the step of confirming, with a generic detection technique, the undesirability of the at least one specific electronic message. The method of claim 16 wherein the confirming step comprises the step of requiring that a predetermined threshold number of users signal that the at least one specific electronic message is undesirable.

The extracting step preferably comprises the steps of: scanning the specific electronic message for any signatures in the at least one signature database; and comparing, responsive to finding a matching signature in the scanning step, the matching signature to each message variant in a matching cluster. The comparing step preferably comprises the steps of: computing a hashblock for the specific electronic message; and comparing the computed hashblock with variant hashblocks in the identification information of each archetype component. It is preferable that the method of the present invention further comprise the steps of: if an exact variant hashblock match is found, retrieving the full text stored copy of the variant match using the pointer, and if the full text stored copy of the variant match and the full text of the specific electronic message are deemed sufficiently similar to regard the specific electronic message as an instance of the variant, extracting alert data from the specific electronic message and adding it to the alert data for the variant match; else if an exact variant hashblock match is not found or the full text of the specific electronic message is found to be insufficiently similar to any of the variants in the database, determining whether the specific electronic message is sufficiently similar to any existing cluster; if the specific electronic message is sufficiently similar to an existing cluster, computing new identification information associated with specific electronic message; else if the specific electronic message is not determined to be sufficiently similar to an existing cluster, creating a new cluster for the specific electronic message. The determining step preferably comprises the steps of: computing a checksum of a region of the specific electronic message indicated in the extended character sequence information for each cluster; and comparing the computed checksum with a stored checksum in the extended character sequence information of each cluster. The method preferably further comprises the step of creating, if no signature match is found, a new cluster for the specific electronic message. The extended character sequence information preferably includes a beginoffset field, a regionlength field and a CRC field, the method further comprising the steps of: determining, for each cluster, a matching region with a longest regionlength; and identifying, if the longest regionlength among all the clusters is at least equal to a specified threshold length, a longest regionlength cluster as an archetype cluster to which the specific electronic message archetype is to be added. Finally, the method of the present invention preferably comprises the step of recomputing the scanning information of the identified cluster. The alert data preferably includes a receivetime field having a time at which a copy was originally received and wherein the method further comprises the steps of: periodically comparing the receivetime field of all variants of each signature cluster with the current time; and removing a signature cluster in which none of the receivetime fields are more recent than a predetermined date and time.

The scanning step preferably comprises the steps of: extracting a message body; transforming the message body into an invariant form; scanning the invariant form for exact or near matches to the detection data; and determining, for each match, a level of match.

The taking step preferably comprises the step of taking appropriate action, upon discovering the presence of the at least one specific electronic message or variants thereof The taking step can comprise the step of labeling the at least one specific electronic message or variants thereof as undesirable or confidential. The taking step also can comprise the step of removing the at least one specific electronic message or variants thereof.

The taking step preferably comprises the step of taking appropriate action for each determined level of match, responsive to one or more user preferences and the determining step preferably comprises the steps of: finding the longest regional matches for each match; computing hashblock similarities between a hashblock of the scanned message and hashblocks of each of the extracted detection data; receiving one or more user preferences; and determining a level of match responsive to the finding, computing and receiving steps.

The present invention also includes a program storage device, readable by a machine, tangibly embodying a program of instructions executable by the machine to perform method steps for hindering an undesirable transmission or receipt of electronic messages within a network of users, the method comprising the steps of: determining that transmission or receipt of at least one specific electronic message is undesirable; automatically extracting detection data that permits detection of the at least one specific electronic message or variants thereof; scanning one or more inbound and/or outbound messages from at least one user for the presence of the at least one specific electronic message or variants thereof; and taking appropriate action, responsive to the scanning step.

Finally, the present invention also includes a system for hindering an undesirable transmission or receipt of electronic messages within a network of users, comprising: means for determining that transmission or receipt of at least one specific electronic message is undesirable; means for automatically extracting detection data that permits detection of the at least one specific electronic message or variants thereof, means for scanning one or more inbound and/or outbound messages from at least one user for the presence of the at least one specific electronic message or variants thereof; and means for taking appropriate action, responsive to the scanning means. Otherwise, the preferable embodiments of the system match those of the method of the present invention.

BRIEF DESCRIPTION OF THE DRAWING

The present invention will be understood by reference to the drawing, wherein.

Figure 1:
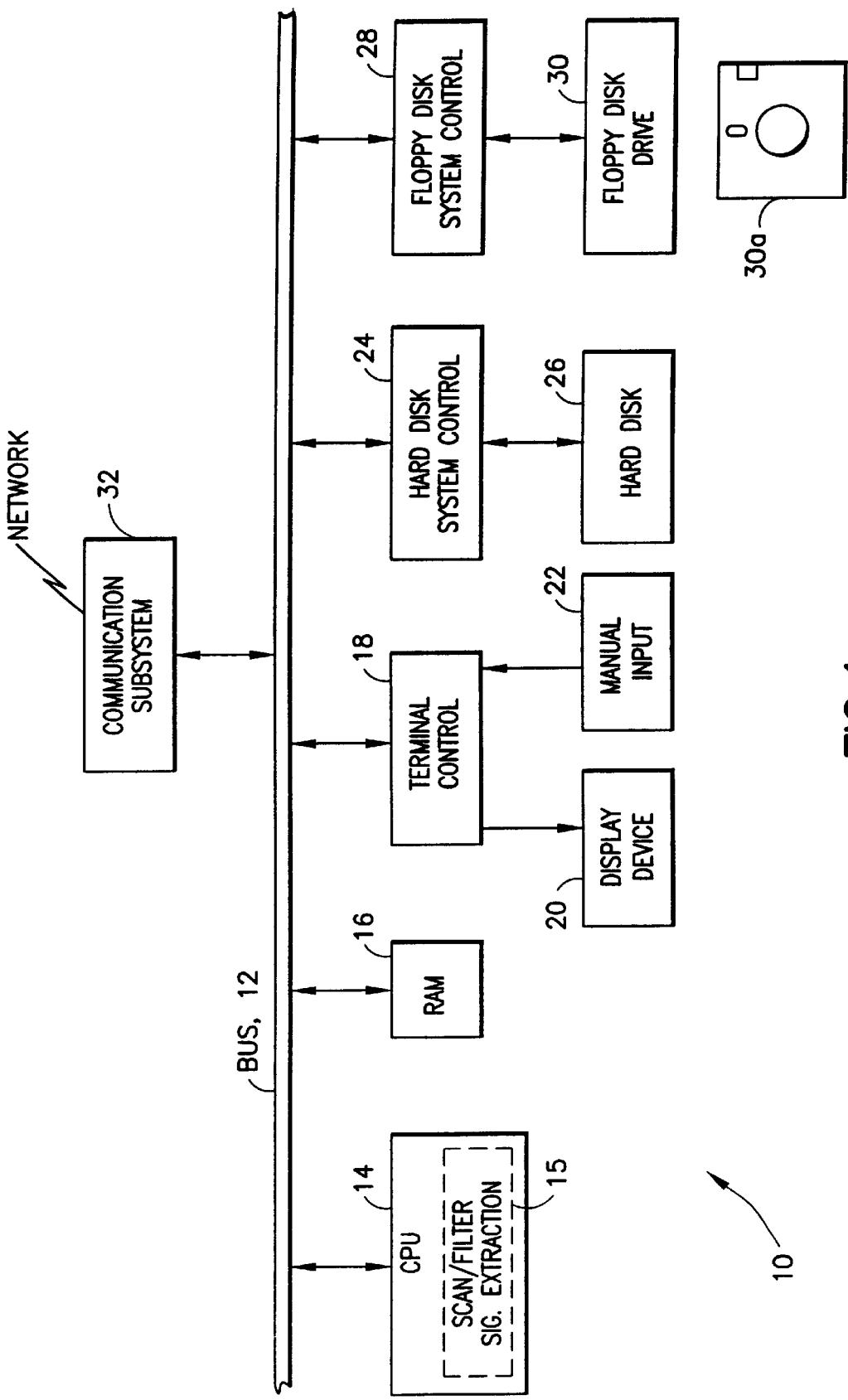
FIG. 1 is a block diagram of a computer system for practicing the teaching of the present invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with preferred embodiments. It is intended that changes and modifications can be made to the described embodiments without departing from the true scope and spirit of the subject invention as defined by the appended claims.

DETAILED DESCRIPTION OF THE PREFERRED EMBODIMENT

FIG. 1 is a block diagram of a system 10 that is suitable for practicing the teaching of the present invention. A bus 12 is comprised of a plurality of signal lines for conveying addresses, data and controls between a central processing unit (CPU) 14 and a number of other system bus units. A random access memory (RAM) 16 is coupled to the system bus 12 and provides program instruction storage and working memory for the CPU 14. A signature extraction module and a scan/filter module 15, the methods of which are described hereinbelow, can run on CPU 14 or, alternatively, on separate CPUs. A terminal control subsystem 18 is coupled to the system bus 14 and provides outputs to a display device 20, typically a CRT or LCD monitor, and receives inputs from a manual input device 22, such as a keyboard or pointing device. A hard disk control subsystem 24 bidirectionally couples a rotating fixed disk, or hard disk 26, to the system bus 12. The control 24 and hard disk 26 provide mass storage for CPU instructions and data. A floppy disk control subsystem 28 which, along with a floppy disk drive 30, is useful as an input means in the transfer of computer files from a floppy diskette 30*a* to system memory, bidirectionally couples the floppy drive 30 to the system bus 12. Finally, a communication subsystem 32 is coupled to the system bus 14 and provides a link to networks such as the Internet.

The components illustrated in FIG. 1 may be embodied within a personal computer, a portable computer, a workstation, a minicomputer or a supercomputer. As such, the details of the physical embodiment of the data processing system 10, such as the structure of the bus 12 or the number of CPUs 14 that are coupled to the bus, is not crucial to the operation of the present invention, and is not described in further detail hereinbelow.

In broad terms, the method of the present invention comprises two phases. First, in a signature extraction phase, an undesirable (or confidential) message that is currently unrecognized as such by the system is labeled as undesirable (or confidential) by a first alert user, perhaps assisted by an automated procedure, and certain signature data are automatically extracted from that message and placed in one or more databases distributed to the user population. Second, in a signature scanning phase, at least one user's set of messages (possibly including the first alert user's set) is scanned using the extracted signature data in an effort to find instances of the substantially similar messages, and an appropriate action is taken whenever such messages are encountered.

Figure 2:
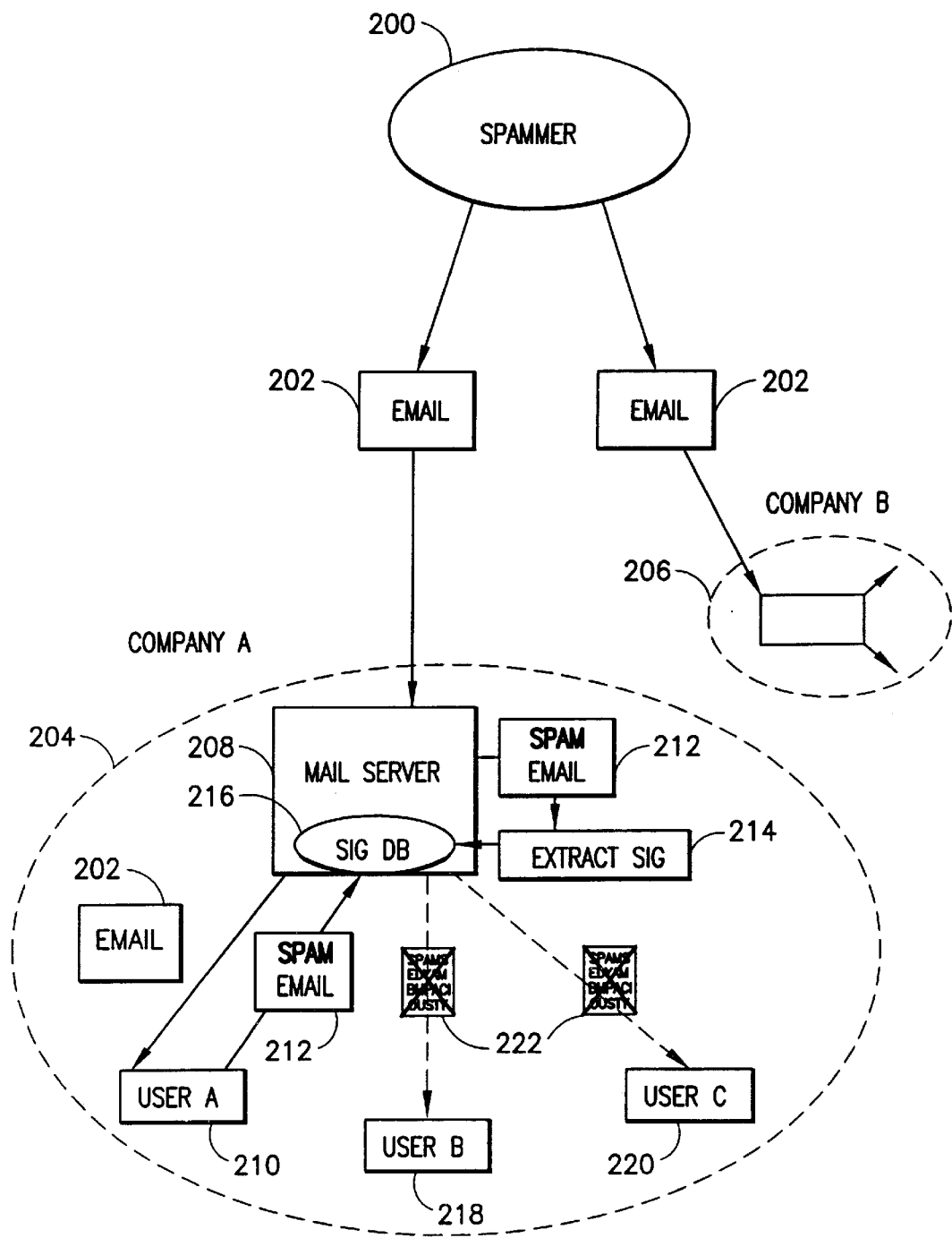
FIG. 2 is a schematic diagram of a system environment in which an embodiment of the present invention is applied.

FIG. 2 shows a computer system environment in which one embodiment of the present invention that specifically addresses spam is applied. A spammer 200 transmits spam 202 to company A 204 and company B 206. In practice, the spam 202 would be sent to many different companies. Assuming that company A 204 utilizes the present invention, the spam 202 could be received at the mail server 208 in which one or more users maintain accounts. Assuming that user A 210 accesses his/her mail, the spam 202 is found in his/her list of incoming mail. In response to user A 210 identifying the spam 202 as such, the identified spam 212 is labeled as such and the signature extraction phase of the present invention is commenced.

In the signature extraction phase of the present invention, the identified spam 212 could be forwarded by the mail server 208 to a signature extraction engine 214. Once extracted by the signature extraction engine 214, the signature of the identified spam 212 is returned to the mail server 208 and stored in a signature database 216. In the signature scanning phase of the present invention, the incoming (or outgoing) messages of user B 218 and user C 220 are scanned using the extraction signature data in the signature database 216. Here, instances of substantially similar messages 222 are flagged for the users, eliminated from their inboxes or prevented from being transmitted.

The two phases may operate simultaneously and asynchronously across a user population. For example, user A could have his messages scanned for known undesirable messages 1 and 2 while she reads message 3 and labels it undesirable. Minutes later, user B's messages may be scanned for the presence of undesirable messages 1, 2 and 3. Half an hour later, user C may discover a fourth undesirable message 4, and an hour later user A's messages may be scanned again, this time for the presence of 1, 2, 3 and 4. The present invention provides for the scanning of outbound messages as well as inbound messages. This is particularly advantageous for types of messages that are likely to be forwarded from one user to several other users, such as hoaxes, chain letters, and confidential messages. Catching an undesirable outbound message before it can be forwarded is considerably more efficient than dealing with the message after it has been sent to what could be a multitude of recipients.

Figure 3:
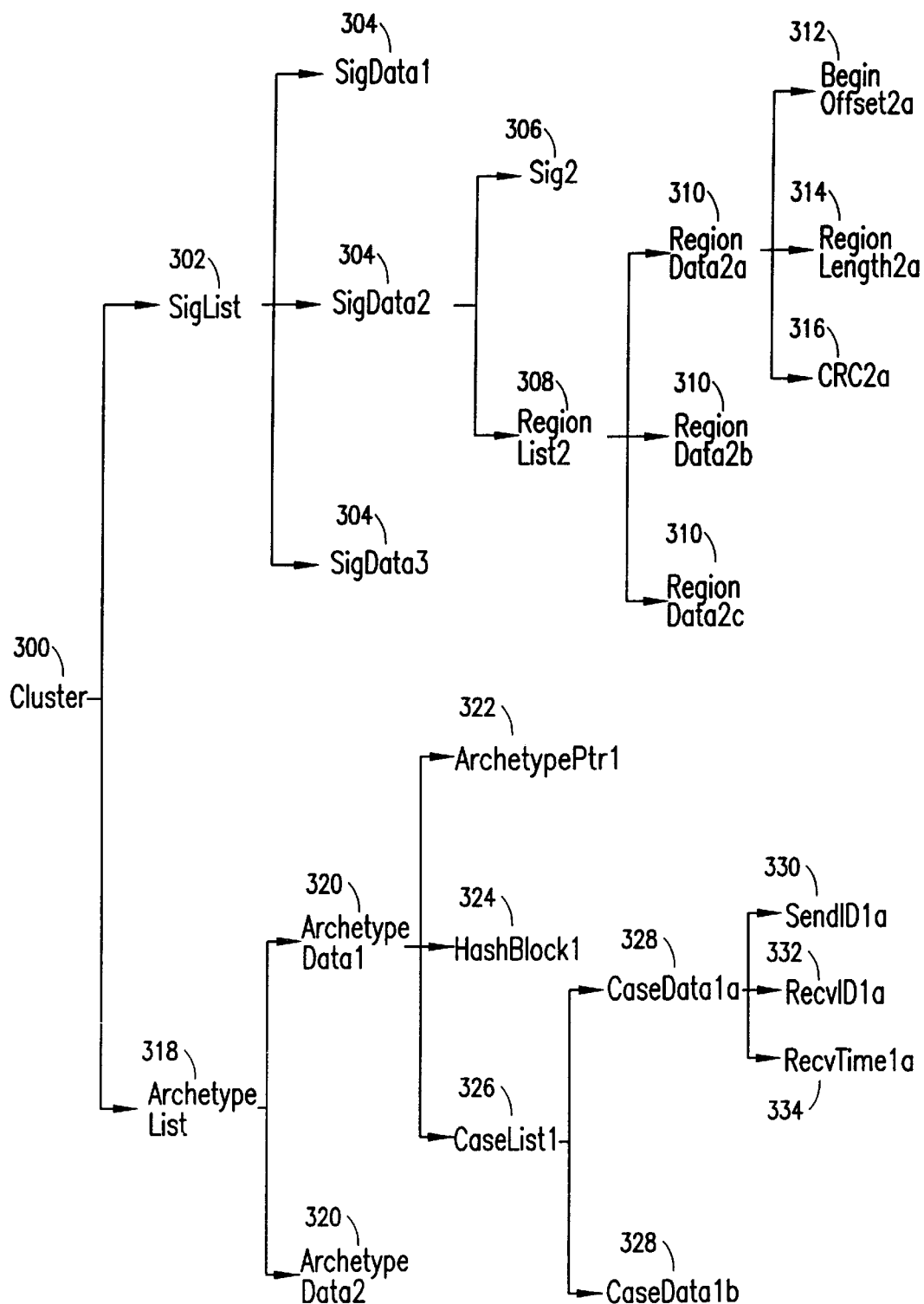
FIG. 3 is a schematic diagram of a signature data structure of an embodiment of the present invention.

A preferred data structure for representing signature data that are extracted from a message in the first phase of the present invention and then used later, in the second phase of the present invention, to recognize a duplicate or similar message is illustrated in FIG. 3. One skilled in the art will appreciate that more or less elaborate data structures may be used in the present invention. Undesirable messages are clustered into sets of substantially similar messages. Within a cluster, there may be one or more variants, referred to as archetypes. In many cases, each cluster will contain just a single archetype. However, under some circumstances (particularly for hoaxes, which may come in several related variants) it may be useful to regard slight variants of a message as belonging to the same cluster. Allowing for more than one archetype within a cluster enables the same signatures to be used to detect several different variants. This results in more efficient storage and somewhat faster scanning, and it also makes it more likely that new variants will be recognized as such. Furthermore, the sophisticated nature of the signature extraction data of the present invention provides for flexibility in tuning the system so that a trade-off is made between detecting variants and reducing false-positives.

A signature database of one embodiment of the present invention consists of a set of archetype Clusters, each distinguished by a unique ClusterID identifier. Each Cluster 300 has two basic components. The first component is SigList 302. SigList 302 is a list of SigData elements 304, each of which contains information pertaining to specific character sequences found in members of the archetype cluster 300. Three SigData elements, SigData1, SigData2 and SigData3, are shown. Each SigData element 304 in the SigList 302 contains two parts. For illustration, only SigData2 is expanded. The first part of SigData2 304, Sig2 306, is a relatively short textual pattern that will be searched for by the message scanner. The second part, RegionList2 308, is a list of RegionData elements 310 associated with Sig2 306, each of which contains information about a longer character sequence contained in all archetypes in the cluster. Each RegionData element 310 contains three elements: 1) BeginOffset 312, an offset in bytes of the beginning of the character sequence from the beginning of the signature; 2) RegionLength 314, the number of characters in the character sequence; and 3) CRC 316, a checksum of the character sequence.

The second component of each Cluster 300 is ArchetypeList 318. ArchetypeList 318 is a list of ArchetypeData elements 320, each of which contains data pertaining to a particular archetype. In particular, each ArchetypeData element 320 may contain: 1) ArchetypePtr 322, which is a pointer to a stored copy of an archetype message so that its full text can be retrieved as needed; 2) HashBlock 324, which is a block of data computed from the body of the archetype, and used to measure overall similarity to other messages; and 3) CaseList 326, which is a list of CaseData elements 328, each of which contains data pertaining to specific instances where a copy of the archetype was/ received and reported as undesirable by a user. In particular, each CaseData element 328 may contain: 1) SendID 330, which is the identity of the sender of the copy; 2) RecvID 332, the identity of the recipient who reported the copy; and 3) RecvTime 334, the time at which the copy was originally received.

Signature Extraction

Figure 4:
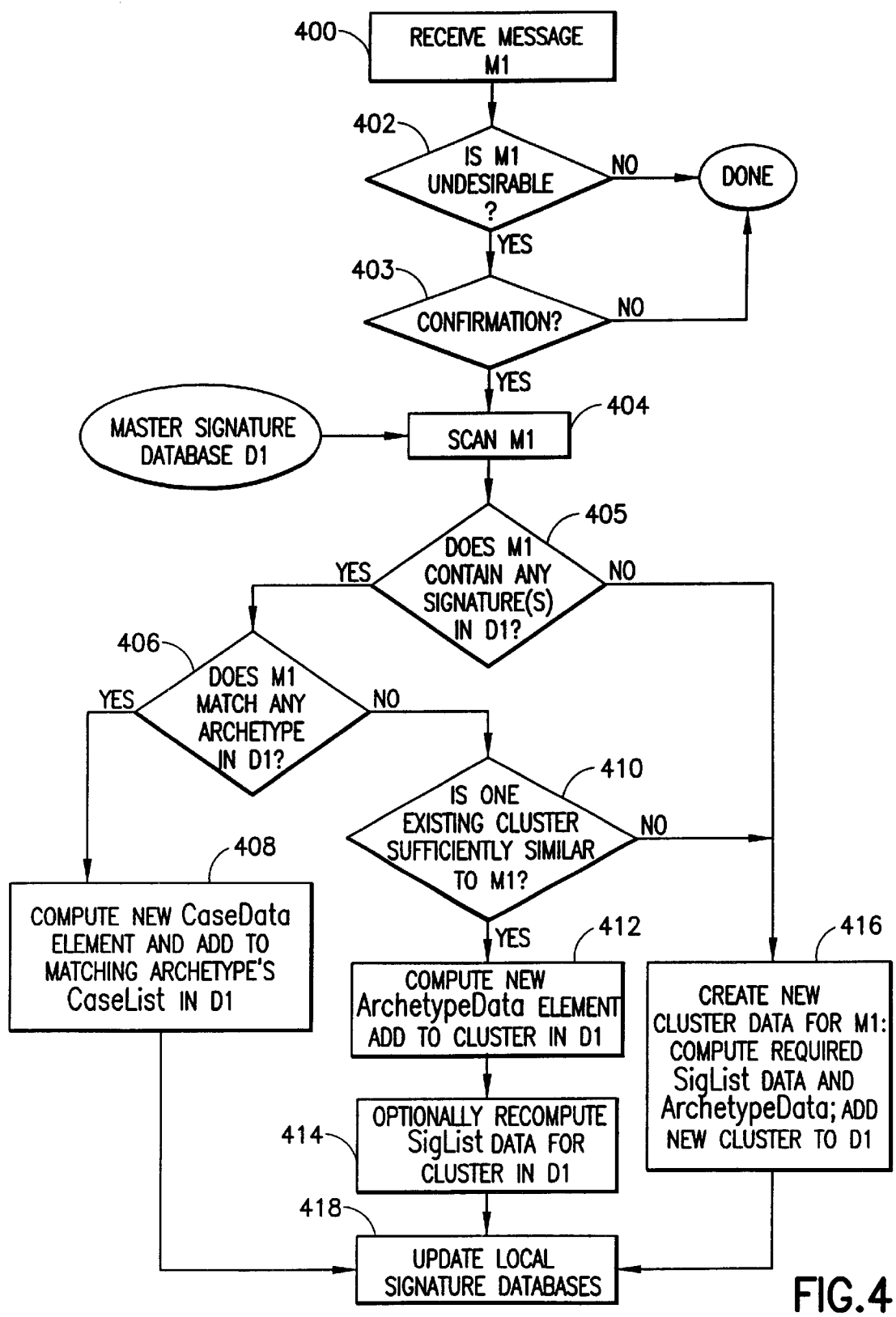
FIG. 4 is a flow diagram of the signature extraction phase of an embodiment of the present invention.

A preferred embodiment of the signature extraction phase of the present invention, during which a method for detecting a specific, previously unknown undesired (or confidential) message is derived and disseminated to a network of users, is described with reference to FIG. 4. The present invention can be used in an environment with one or more mail users. As the number of mail users increases, the advantages of the present invention increase. In step 400, a first (alert) user receives a message M1. The user reads the received message M1 and, if he believes it to be "undesirable" in the sense that it is likely to be widely circulated and widely held to be unwelcome (or that it is confidential), that user indicates to the system that the message M1 is to be flagged as undesirable (or confidential), e.g., by clicking a special button in the user interface. Optionally, a generic detection method may be used to help the user identify the message as undesirable in the first place. In any case, if the user has indicated to the system that the message should be flagged as "undesirable" at step 402, a copy of the message M1 is sent and/or input to an automatic signature extraction procedure in step 404. Optionally, in step 403, identification of the message as undesirable can be confirmed in a number of ways. The confirmation could be provided by an authorized human user. It could be given only after a threshold number of users have all labeled that message as undesirable. Finally, it could be provided by a separate automated process (e.g., one that uses a generic technique to detect spam). If confirmation that the message is undesirable is provided, the method would continue at step 404. By permitting the mail system users themselves to identify the undesirable or confidential messages, dependence upon experts at a centralized operations center is avoided.

At step 404, the message M1 is scanned for the presence of any signatures contained in a master signature database D1. If, at step 405, the message M1 is found to contain at least one of the signatures in the master signature database D1, then at step 406, the message is compared with each archetype associated with each Cluster that contains a matching signature in one of its Sig components to determine if a match with any archetype in D1 exists. A preferred method of comparison is to compute a HashBlock for the message and to compare this HashBlock with the HashBlock for each candidate archetype. If an exact archetype match is found (e.g., if the hashblock distance is computed to be zero), then the matching candidate's ArchetypePtr 322 is used to retrieve its full text. Finally, if the full texts of the archetype and the message are deemed sufficiently similar to regard the message as an instance of the archetype, then at step 408, the relevant CaseData information 328 is extracted from the message and added to the CaseList 326 in D1 for that archetype. Control then passes to step 418. However, if at step 406, an exact archetype match is not found or the full text of the message is determined to be insufficiently similar to the full text of the archetype, then at step 410, a determination is made as to whether the new archetype is sufficiently similar to an existing cluster of archetypes and, if so, which cluster. Preferably, for each Cluster that contains a matching signature in one of its Sig components, each RegionData element 310 in the RegionList 308 associated with that Sig 306 is compared with the message M1 by computing the checksum of the region indicated by BeginOffset 312 and RegionLength 314, and a match is declared if the checksum of that region within the message is equal to the value stored in CRC 316. The matching region with the longest RegionLength 314 is determined for each Cluster. If the longest RegionLength 314 among all Clusters is at least equal to a specified threshold length, then the Cluster with the longest RegionLength 314 is identified as the archetype cluster to which the new archetype should be added. Thus, at step 412, the archetype data are computed and added, as a new ArchetypeData element (with all substructures filled with the required information), to this Cluster's ArchetypeList.

Optionally, at step 414, the Cluster's SigList 302 may be recomputed to reflect the addition of a new archetype to the cluster. A matching algorithm (such as a suffix array routine) can be used to identify one or more sequences of characters found among all of the archetypes, and the derivation of the SigList data detailed hereinbelow with reference to FIG. 5 can be applied only to the set of commonly occurring character sequences, rather than to the entire message body. The method continues in step 418.

If, at step 405, the message M1 is found to contain none of the signatures in the master signature database D1 or if no archetype cluster is found to be sufficiently close to the new archetype in step 410, then the method continues in step 416. At step 416, a new archetype cluster is created for the message M1, a single ArchetypeData element containing the required information is created and placed in the ArchetypeList, and a set of signatures and associated data is computed and placed in SigList. Finally, the archetype Cluster is assigned its unique ClusterID and added to the master signature database D1. The signatures in SigList are computed automatically by an automatic signature extraction procedure that selects character sequences that are unlikely to be found in other messages. Further detail on a preferred method for this procedure is provided hereinbelow with reference to FIG. 5. A signature may consist of a sequence of characters, or mote generally a pattern of characters, found in the message itself or in a preprocessed-version of the message. It may be accompanied by additional information such as checksums of the entire message and/or portions of it, checksums or other compressed data strings derived from one or more transformations of the message. This additional information may be stored in the RegionList 308 associated with each signature as illustrated in FIG. 3.

Finally, in step 418, local signature databases serving one or more individual user nodes are updated to reflect the updates that have been applied to the master signature database D1 at steps 408, 414 or 416. This can be achieved by using standard database updating or replication techniques to ensure that the local databases are exact replicas of the master signature database, or by selectively sending or selectively receiving and incorporating signatures and associated auxiliary data according to a set of criteria that may vary across different local signature databases.

Derivation of SigList Data

Figure 5:
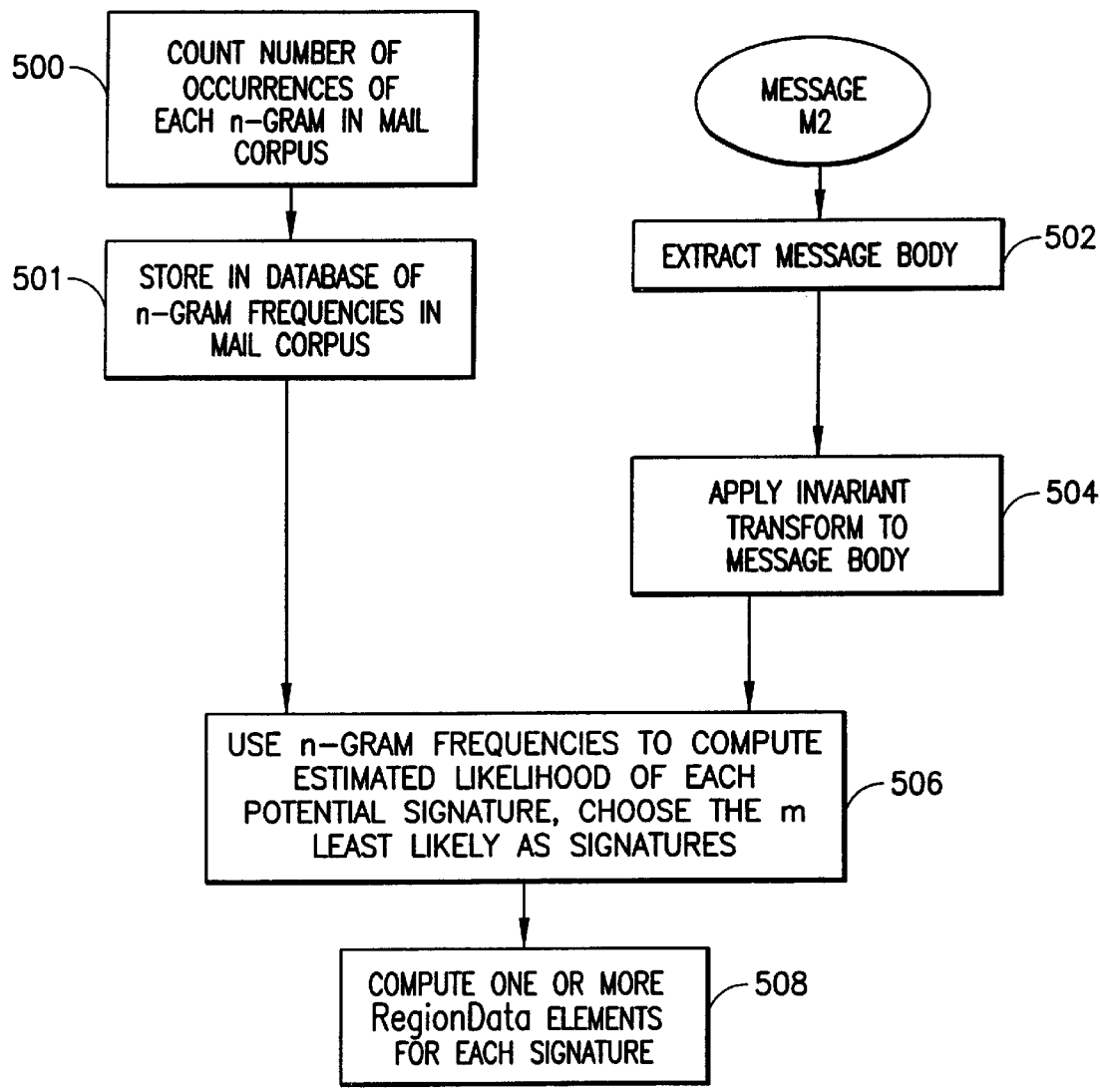
FIG. 5 is a flow diagram of details of a signature extraction procedure of an embodiment of the present invention.

A preferred embodiment of the procedure for extracting or computing the SigList data for a given archetypal message, employed in steps 414 and 416, is now described with reference to FIG. 5. First, at step 500, the number of occurrences of all byte sequences less than or equal to a chosen threshold length within a corpus of mail messages is tallied. In a preferred embodiment, the threshold length is three, i.e. the number of occurrences of all 1-, 2-, and 3-byte sequences (referred to as 1-grams, 2-grams and 3-grams, respectively) is tallied. In step 501, the number of occurrences tallied is then stored in compressed form in an n-gram frequency database. The n-gram frequency database requires no more than a few megabytes of storage. The database may be computed for each user individually from a corpus consisting of archived messages received by that user, or a universal database could be computed from a standard corpus of generic messages culled from several users. This universal database could then be distributed throughout the user population. The database could be updated periodically. Details of where, the database is originally produced and how frequently it is updated have no bearing on the remaining steps of the signature extraction procedure.

At step 502, the body of the message M2 from which the signature is to be extracted is isolated. At step 504, the extracted body is transformed into an "invariant" form by removing all non-alphanumeric characters and replacing all uppercase letters with their lowercase versions (see FIG. 6). Next, at step 506, one or more sequences of characters that are highly unlikely to be found in a typical message are identified. The one or more sequences constitute the signature or signatures. The identification of unlikely character sequences can be carried out by the method described in U.S. Pat. No. 5,452,442 (442 patent) entitled "Methods and Apparatus for Evaluating and Extracting Signatures of Computer Viruses and Other Undesirable Software Entities," issued Sep. 19, 1995, which is hereby incorporated by reference. This method was originally applied to the automatic extraction of computer virus signatures: Several candidate signatures taken from the message are selected, and for each the n-gram statistics from the n-gram frequency database, they are combined using formulas found in the 442 patent to estimate the likelihood for each candidate signature to appear in a random ordinary mail message. The candidate signature or signatures with the least likelihood of appearing in an ordinary mail message are selected.

Taken together, steps 502, 504 and 506 describe the derivation of the text string element labeled Sig 306 in FIG. 3. Optionally, the false positive rate may be reduced further by computing a list of RegionData 310 associated with Sig 306. This may be achieved at step 508 by the following procedure for each derived signature. A series of "regions," each consisting of a character sequence that contains the signature, is chosen. In a preferred embodiment, the series consists of a first region that is roughly centered on the signature and approximately twice the length of the signature, a second region that contains the first region and is roughly twice the size of the first, and so on until the final region in the series consists of the entire transformed message body. For each region, the offset of its first character from the first character of the signature (typically a negative integer) is recorded, along with the length of the region and a checksum of the region's character sequence. These three elements constitute the RegionData 310 for that region. The checksum may employ any convenient method, such as a cyclical redundancy check, and preferably should be at least 32 bits.

Deriving HashBlock Data

A preferred embodiment of the method for computing the HashBlock data for a given message, as required in steps 412 and 416, is now described. First, the message body is transformed. The transformation may be the same as or different from the transformation applied to the message body prior to signature extraction (step 504). For example, the transformations could be identical, except that blank spaces would be retained in the transformed message body for purposes of computing the HashBlock. Then, the transformed message body is divided into small individual units that may or may not overlap. For example, the individual units may be all consecutive 5-character sequences (which overlap), or they may be non-overlapping "words" (individual units delimited by blank spaces). Non-overlapping units are preferable. For each individual unit, a hash function maps that unit to a small integer hash value (say in the range 0–255). An array of hash value counts is kept, and each time a particular hash value is computed, the count for that value is incremented by 1. If the number of counts is capped at 15 or, alternatively, if it is computed modulo 16 (that is, the recorded number is the remainder of the actual number when divided by 16) then only 4 bits are required for each count, and an array of 256 hash values can be expressed as a HashBlock of just 128 bytes. Note that this HashBlock will be relatively insensitive to additions, deletions and rearrangements of words, provided that the number of changes is not too great.

Pruning of the Signature Databases

In order to prevent unlimited growth of the master and local signature databases, they may be pruned periodically to remove Cluster data for which there have been no recent reported instances. Preferably, at periodic intervals (daily, for example), each Cluster in the master signature database is examined. All RecvTime elements 334 in the cluster structure are compared with the current time, and if none are more recent than some specified date and time, then the entire Cluster is removed from the master signature database. The removal of this cluster is communicated to all local signature databases, and any that include this cluster can eliminate it as well.

Signature Scanning

During the signature scanning phase of the inventions, one or more users' messages are scanned for the possible presence of specific messages that have been labeled as undesirable (or as confidential). Although hundreds, thousands or even millions of users may be protected by the present invention, it is most convenient to focus on an individual "second user." The scanning procedure employs a local signature database that is continually updated as new undesirable messages are discovered by other users, and may be specific to a particular user or shared by several users. The scan may take place periodically, or in response to a request by the user or some other event (such as a notification that the local signature database has been updated since the last scan). Furthermore, the scan may take place at different times and under different circumstances for different users. In the typical case in which the messages are electronic mail, the scan is applied preferably only to those items that are in the user's inbox, although it may be applied to other specified folders as well if the user so desires.

Figure 6:
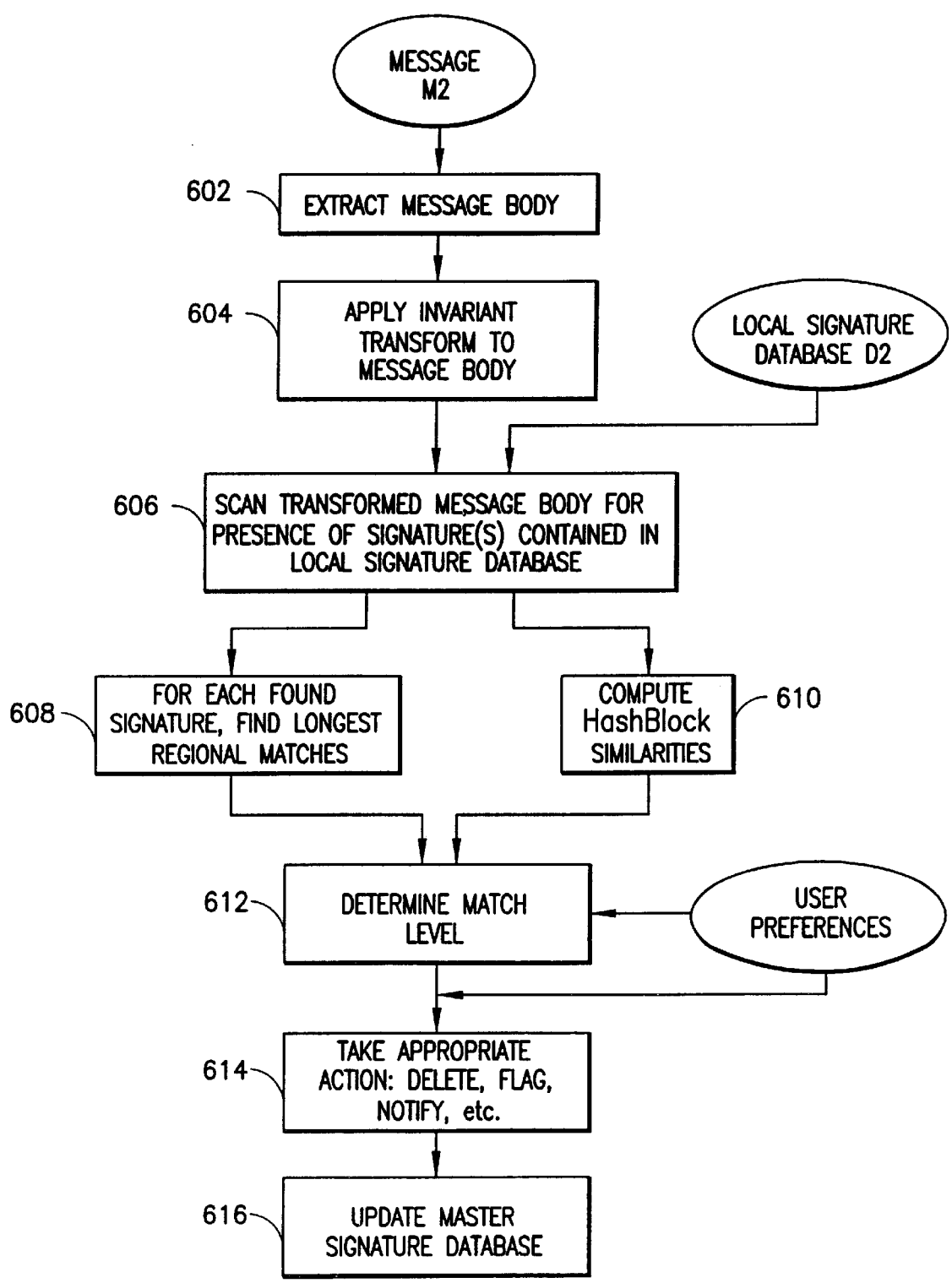
FIG. 6 is a flow diagram of the signature scanning phase of an embodiment of the present invention.

A preferred embodiment of the scanning procedure is described with reference to FIG. 6. At step 602, the body of the message M2 to be scanned is extracted. Then, at step 604, the message body is transformed into the same invariant form as was applied at step 504. At step 606, the invariant form of the message body is scanned for exact or near matches to any of the signatures included in a local signature database D2, which has been constructed from all or a portion of the Cluster data structures in one or more master signature databases. If no signatures are found, the message is not deemed undesirable (or confidential), and the process terminates.

However, if one or more signatures are found at step 606, then at step 608, the auxiliary information contained in the associated RegionData elements 310 is used to assess the degree of match to one or more known undesirable messages. Specifically, for each signature Sig 306 appearing in the message, all Clusters in which Sig 306 appears are considered in turn. For each such Cluster 300, the RegionList 308 associated with Sig 306 is considered. First, the RegionData element 310 with the largest RegionLength 314 is checked by computing the checksum of the corresponding region within the scanned message. If the checksum matches the CRC 316 for this RegionData element 310, this RegionData element 310 and the associated ClusterID are added to a list BestRegionDataElements, and the next Cluster is then considered. If the checksum does not match, the RegionData element 310 with the next longest RegionLength 314 is compared in the same way, and so on until a matching checksum is found. If there is no matching checksum among the RegionData elements 310, then the signature itself and the associated ClusterID are added to the BestRegionDataElements list, and the next Cluster is considered.

At step 610, a locality-preserving hash function is used to compute a HashBlock for the scanned message. The HashBlock of the scanned message is compared with the HashBlocks of each Cluster that contains one of the matching signatures found at step 606, and a similarity computed for each such Cluster. The similarity computation may employ any reasonable metric. A preferred similarity metric for two HashBlocks (H1 and H2) treats each as a 256-element array, each element being represented as 4 bits, and sums the absolute values of the differences between the array elements, i.e. the similarity S is given by $$S = \sum_{j=0}^{255} |H_{1j} - H_{2j}| \quad (1)$$

if the array elements are capped at 16, and alternatively by $$S = \sum_{j=0}^{255} ((H_{ij} - H_{2j} + 16) \bmod 16) \quad (2)$$

if the array elements are stored modulo 16.

The ClusterID and the similarity S are added to a list HashBlockSimilarity, and then the next Cluster is considered until there are no more Clusters that contain one of the matching signatures found at step 606.

At step 612, the BestRegionDataElements list derived from step 608, the HashBlock-Similarity list derived from step 610 and a set of user preferences are combined to determine a degree or level of match. The user preferences may consist of one or more thresholds for HashBlock similarity, one or more thresholds for RegionLength 314, and conditions on various aspects of the MsgData component of the Cluster referred to in the BestRegionDataElements and HashBlockSimilarity lists. In a typical application, the user preferences may be set at some default settings which may be overridden by advanced users, if they choose.

As an explicit example, suppose that there are four discrete levels of match: perfect, high, medium and low. Then a reasonable set of user preferences might be as follows. For a match level to be regarded as perfect, there must exist a Cluster for which the HashBlock similarity distance is zero, and for which at least two users in the MsgList for that Cluster have a RecvID 332 within the same e-mail domain as the user. Otherwise, for a match level to be regarded as high, there must exist a Cluster for which the HashBlock similarity distance is less than 5 or the longest region length in BestRegionDataElements is at least 500 characters, and for which at least two users in the MsgList for that Cluster have a RecvID 332 within the same e-mail domain as the user. Otherwise, for a match level to be regarded as medium, there must exist a Cluster for which the longest region length is at least 100 characters, and for which there are least two distinct users in the MsgList, with no restrictions on domain or other characteristics. Otherwise, the match level is to be regarded as low.

At step 614, another set of rules within the user's set of preferences is applied to the level of match determined at step 612 to determine and carry out the appropriate response. Appropriate responses may include automatically deleting the message, altering its appearance in the user's inbox (for example by annotating or colorizing it), storing it in a special folder, etc. For example, if the match level is perfect, the user may indicate that the mail should be automatically deleted; if the match level is high, the mail should be placed in a special "probable spam" folder; if the match level is medium, the mail summary appearing in the inbox should be colored green, and the message body should be prefixed with a brief explanation of why the message is believed to be closely related to a known instance of undesirable mail. The user's preferences may also specify particular messages that, regardless of their level of match, are not to be regarded as undesirable (such as ones sent by their manager or their company's chief executive officer).

Optionally, if an undesirable message has been discovered, then at step 616 the master signature database may be updated with information about the new instance of the undesirable message. The update may occur upon discovery, or alternatively may occur only after the user has confirmed that the message is undesirable. For example, in the case of a perfect match, the information may consist of CaseData 328 for the undesirable message (i.e. the identity of the sender and receiver and the time of receipt). This information could be extracted locally and then sent to the location of the master signature database, where it would be incorporated. In the case of a high or even a medium level of match, the entire message might be sent to the location of the master signature database, and it would enter the signature extraction phase at step 404, where an attempt would be made to create a new archetype and place it in an appropriate archetype cluster.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

What is claimed is:

1. A method of hindering an undesirable transmission or receipt of electronic messages within a network of users, comprising the steps of:

determining that transmission or receipt of at least one specific electronic message is undesirable;

automatically extracting detection data that permits detection of the at least one specific electronic message or variants thereof, wherein said automatically extracting includes automatically ideniitifying and storing a text string signature contained within an undesirable electronic message, said text string signature being statistically unlikely to be found in desirable electronic messages;

scanning one or more inbound and outbound messages from at least one user for the presence of the at least one specific electronic message or variants thereof wherein said scanning includes searching for said text string signature within said inbound and outbound messages; and taking appropriate action, responsive to the scanning step.

2. The method of claim 1 further comprising the step of storing the extracted detection data.

3. The method of claim 1 wherein the determining step comprises the step of receiving notification that proliferation of the at least one specific electronic message is undesirable.

4. The method of claim 3 wherein the receiving step comprises the step of receiving a signal from an alert user identifying the at least one specific electronic message as undesirable or confidential.

5. The method of claim 4 wherein the at least one specific electronic message is received in an inbox of the alert user.

6. The method of claim 4 wherein the receiving step comprises the step of providing an identifier for the alert user to indicate that the specific electronic message is to be flagged as undesirable.

7. The method of claim 6 wherein the providing step comprises the step of providing a generic detector to aid in identification of undesirability of electronic messages.

8. The method of claim 2 wherein the extracting step comprises the step of extracting, from the at least one specific electronic message, signature information.

9. The method of claim 8 wherein the storing step comprises the step of adding, responsive to the scanning step, information pertaining to the at least one specific electronic message to the signature information.

10. The method of claim 2 wherein the extracting step comprises the step of extracting a signature from the at least one specific electronic message.

11. The method of claim 10 wherein the storing step comprises the step of storing the signature in at least one signature database.

12. The method of claim 11 wherein the signature database comprises a plurality of signature clusters, each cluster including data corresponding to substantially similar electronic messages.

13. The method of claim 12 wherein each of the signature clusters comprises a character sequence component having scanning information and an archetype component having identification information about particular signature variants.

14. A method of hindering an undesirable transmission or receipt of electronic messages within a network of users, comprising the steps of:

determining that transmission or receipt of at least one specific electronic the message is undesirable;

automatically extracting detection data that permits detection of the at least one specific electronic message or variants thereof;

scanning one or more inbound and/or outbound messages from at least one user for the presence of the at least one specific electronic message or variants thereof;

taking appropriate action, responsive to the scanning step; and storing the extracted detection data, wherein the extracting step comprises the step of extracting a signature from the at least one specific electronic message;

wherein the storing step comprises the step of storing the signature in at least one signature database;

wherein the signature database comprises a plurality of signature clusters, each cluster including data corresponding to substantially similar electronic messages;

wherein each of the signature clusters comprises a character sequence component having scanning information and an archetype component having identification information about particular signature variants; and wherein the scanning information includes a search character sequence for a particular electronic message and extended character sequence information for all the electronic messages represented in the cluster and wherein the identification information includes a pointer to a full text stored copy of an electronic message relating to a particular signature variant, a hashblock of the electronic message, and alert data corresponding to specific instances where a copy of the electronic message was received and the proliferation of which was reported as undesirable by an alert user.

15. The method of claim 2 wherein the extracting step and the scanning step occur simultaneously and asynchronously across the network of users.

16. The method of claim 4 further comprising the step of confirming, before the scanning step, the undesirability of the at least one specific electronic message.

17. The method of claim 16 wherein the confirming step comprises the step of confirming, with a generic detection technique, the undesirability of the at least one specific electronic message.

18. The method of claim 16 wherein the confirming step comprises the step of requiring that a predetermined threshold number of users signal that the at least one specific electronic message is undesirable.

19. The method of claim 14 wherein the extracting step comprises the steps of:

scanning the specific electronic message for any signatures in the at least one signature database; and comparing, responsive to finding a matching signature in the scanning step, the matching signature to each message variant in a matching cluster.

20. The method of claim 19 wherein the comparing step comprises the steps of:

computing a hashblock for the specific electronic message; and comparing the computed hashblock with variant hashblocks in the identification information of each archetype component.

21. The method of claim 20 further comprising the steps of:

if an exact variant hashblock match is found, retrieving the full text stored copy of the variant match using the pointer, and if the full text stored copy of the variant match and the full text of the specific electronic message are deemed sufficiently similar to regard the specific electronic message as an instance of the variant, extracting alert data from the specific electronic message and adding it to the alert data for the variant match;

else if an exact variant hashblock match is not found or the full text of the specific electronic message is found to be insufficiently similar to any of the variants in the database, determining whether the specific electronic message is sufficiently similar to any existing cluster;

if the specific electronic message is sufficiently similar to an existing cluster, computing new identification information associated with specific electronic message;

else if the specific electronic message is not determined to be sufficiently similar to an existing cluster, creating a new cluster for the specific electronic message.

22. The method of claim 21 wherein the determining step comprises the steps of:

computing a checksum of a region of the specific electronic message indicated in the extended character sequence information for each cluster; and comparing the computed checksum with a stored checksum in the extended character sequence information of each cluster.

23. The method of claim 19 further comprising the step of creating, if no signature match is found, a new cluster for the specific electronic message.

24. The method of claim 22 wherein the extended character sequence information includes a beginoffset field, a regionlength field and a CRC field, the method further comprising the steps of:

determining, for each cluster, a matching region with a longest regionlength; and identifying, if the longest regionlength among all the clusters is at least equal to a specified threshold length, a longest regionlength cluster as an archetype cluster to which the specific electronic message archetype is to be added.

25. The method of claim 23 further comprising the step of recomputing the scanning information of the identified cluster.

26. The method of claim 14 wherein the alert data includes a receivetime field having a time at which a copy was originally received and wherein the method further comprises the steps of:

periodically comparing the receivetime field of all variants of each signature cluster with the current time; and removing a signature cluster in which none of the receivetime fields are more recent than a predetermined date and time.

27. The method of claim 1 wherein the scanning step comprises the steps of:

extracting a message body;

transforming the message body into an invariant form;

scanning the invariant form for exact or near matches to the detection data; and determining, for each match, a level of match.

28. The method of claim 1 wherein the taking step comprises the step of taking appropriate action, upon discovering the presence of the at least one specific electronic message or variants thereof.

29. The method of claim 28 wherein the taking step comprises the step of labeling the at least one specific electronic message or variants thereof as undesirable or confidential.

30. The method of claim 28 wherein the taking step comprises the step of removing the at least one specific electronic message or variants thereof.

31. The method of claim 27 wherein the taking step comprises the step of taking appropriate action for each determined level of match, responsive to one or more user preferences.

32. A method of hindering an undesirable transmission or receipt of electronic messages within a network of users, comprising the steps of:

determining that transmission or receipt of at least one specific electronic the message is undesirable;

automatically extracting detection data that permits detection of the at least one specific electronic message or variants thereof;

scanning one or more inbound and/or outbound messages from at least one user for the presence of the at least one specific electronic message or variants thereof; and taking appropriate action, responsive to the scanning step;

wherein the scanning step comprises the steps of:

extracting a message body;

transforming the message body into an invariant form;

scanning the invariant form for exact or near matches to the detection data; and determining, for each match, a level of match, and wherein the determining step comprises the steps of:

finding the longest regional matches for each match;

computing hashblock similarities between a hashblock of the scanned message and hashblocks of each of the extracted detection data;

receiving one or more user preferences; and determining a level of match responsive to the finding, computing and receiving steps.

33. A program storage device, readable by a machine, tangibly embodying a program of instructions executable by the machine to perform method steps for hindering an undesirable transmission or receipt of electronic messages within a network of users, the method comprising the steps of:

determining that transmission or receipt of at least one specific electronic message is undesirable;

automatically extracting detection data that permits detection of the at least one specific electronic message or variants thereof, wherein said automatically extracting includes automatically identifying and storing a text string signature contained within an undesirable electronic message, said text string signature being statistically unlikely to be found in desirable electronic messages;

scanning one or more inbound and outbound messages from at least one user for the presence of the at least one specific electronic message or variants thereof wherein said scanning includes searching for said text string signature within said inbound and outbound messages; and taking appropriate action, responsive to the scanning step.

34. A system for hindering an undesirable transmission or receipt of electronic messages within a network of users, comprising:

means for determining that transmission or receipt of at least one specific electronic message is undesirable;

means for automatically extracting detection data that permits detection of the at least one specific electronic message or variants thereof;

means for scanning one or more inbound and/or outbound messages from at least one user for the presence of the at least one specific, electronic message or variants thereof;

means for taking appropriate action, responsive to the scanning means, further comprising a means for storing the extracted detection data; and means for storing the extracted detection data;

wherein the extracting means comprise means for extracting a signature from the at least one specific electronic message;

wherein the storing means comprise means for storing the signature in at least one signature database;

wherein the signature database comprises a plurality of signature clusters, each cluster including data corresponding to substantially similar electronic messages;

wherein each of the signature clusters comprises a character sequence component having scanning information and an archetype component having identification information about particular signature variants; and wherein the scanning information includes a search character sequence for a particular electronic message and extended character sequence information for all the electronic messages represented in the cluster and wherein the identification information includes a pointer to a full text stored copy of an electronic message relating to a particular signature variant, a hashblock of the electronic message, and alert data corresponding to specific instances where a copy of the electronic message was received and the proliferation of which was reported as undesirable by an alert user.

35. The system of claim 34 wherein the extracting means comprise:

means for scanning the specific electronic message for any signatures in the at least one signature database; and means for comparing, responsive to finding a matching signature by the scanning means, the matching signature to each message variant in a matching cluster.

36. The system of claim 35 wherein the comparing means comprise:

means for computing a hashblock for the specific electronic message; and means for comparing the computed hashblock with variant hashblocks in the identification information of each archetype component.

37. The system of claim 36 further comprising:

means, if an exact variant hashblock match is found, for retrieving the full text stored copy of the variant match using the pointer, means, if the full text stored copy of the variant match and the full text of the specific electronic message are deemed sufficiently similar to regard the specific electronic message as an instance of the variant, for extracting alert data from the specific electronic message and adding it to the alert data for the variant match; and means, else if an exact variant hashblock match is not found or the full text of the specific electronic message is found to be insufficiently similar to any of the variants in the database, for determining whether the specific electronic message is sufficiently similar to any existing cluster;

means, if the specific electronic message is sufficiently similar to an existing cluster, for computing new identification information associated with specific electronic message; and means, else if the specific electronic message is not determined to be sufficiently similar to an existing cluster, for creating a new cluster for the specific electronic message.

38. The system of claim 37 wherein the determining means comprise:

means for computing a checksum of a region of the specific electronic message indicated in the extended character sequence information for each cluster; and means for comparing the computed checksum with a stored checksum in the extended character sequence information of each cluster.

39. The system of claim 35 further comprising means for creating, if no signature match is found, a new cluster for the specific electronic message.

40. The system of claim 38 wherein the extended character sequence information includes a beginoffset field, a regionlength field and a CRC field, the system further comprising:

means for determining, for each cluster, a matching region with a longest regionlength; and means for identifying, if the longest regionlength among all the clusters is at least equal to a specified threshold length, a longest regionlength cluster as an archetype cluster to which the specific electronic message archetype is to be added.

41. The system of claim 39 further comprising means for recomputing the scanning information of the identified cluster.

42. A system for hindering an undesirable transmission or receipt of electronic messages within a network of users, comprising:

means for determining that transmission or receipt of at least one specific electronic message is undesirable;

means for automatically extracting detection data that permits detection of the at least one specific electronic message or variants thereof;

means for scanning one or more inbound and/or outbound messages from at least one user for the presence of the at least one specific electronic message or variants thereof;

means for taking appropriate action, responsive to the scanning means;

wherein the scanning means comprise:
means for extracting a message body;
means for transforming the message body into an invariant form;
means for scanning the invariant form for exact or near matches to the detection data; and
means for determining, for each match, a level of match, and wherein the determining means comprise:
means for finding the longest regional matches for each match;
means for computing hashblock similarities between a hashblock of the scanned message and hashblocks of each of the extracted detection data;
means for receiving one or more user preferences; and
means for determining a level of match responsive to the finding, computing and receiving steps.

* * * * *